No. 817,683. PATENTED APR. 10, 1906.
M. H. WHALEN.
JOURNAL BOX.
APPLICATION FILED MAY 17, 1905.

WITNESSES:
James F. Duhamel
W. H. Clarke

Michael H. Whalen INVENTOR
BY ATTORNEY Victor J. Evans

UNITED STATES PATENT OFFICE.

MICHAEL H. WHALEN, OF NEW YORK, N. Y.

JOURNAL-BOX.

No. 817,683.     Specification of Letters Patent.     Patented April 10, 1906.

Application filed May 17, 1905. Serial No. 260,802.

*To all whom it may concern:*

Be it known that I, MICHAEL H. WHALEN, a citizen of the United States, residing at New York, in the county of New York and State of New York, have invented new and useful Improvements in Journal-Boxes, of which the following is a specification.

This invention relates generally to journal-bearings, and particularly to an improved grease-cage for lubricating the same.

The objects of the invention are to improve and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed as a practical embodiment thereof.

Figure 1:
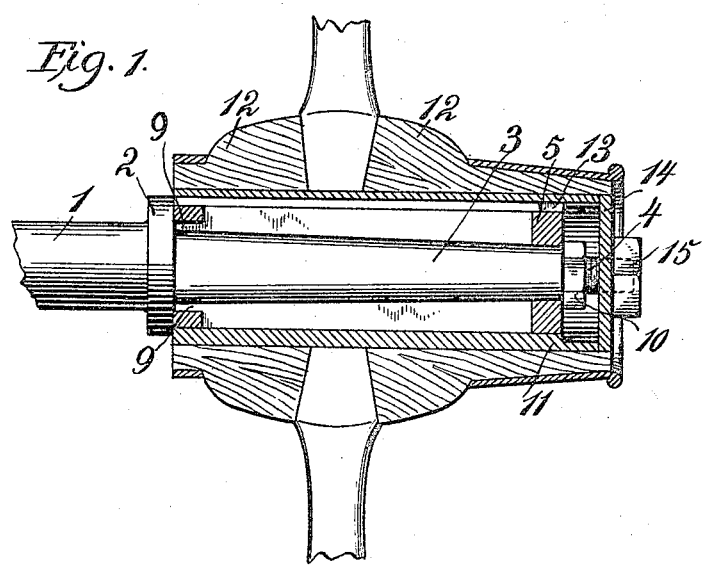
Figure 2:
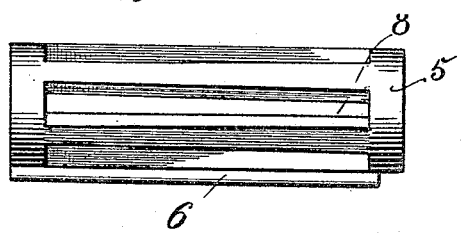
Figure 3:
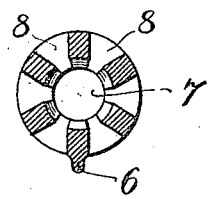
Figure 4:
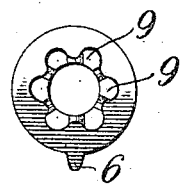

In the accompanying drawings, forming part of this specification, Figure 1 is a sectional view through a journal-bearing constructed in accordance with the invention. Fig. 2 is a side elevation of the grease-cage. Fig. 3 is a transverse section. Fig. 4 is an end elevation of the cage.

Like reference-numerals indicate corresponding parts in the different figures of the drawings.

The reference-numeral 1 indicates an axle having a collar 2, a tapered portion 3, and the reduced screw-threaded end 4. Mounted upon the tapered portion 3 is a grease-cage 5, which comprises a cylindrical member having a longitudinal rib 6, and being formed with a longitudinal tapered passage 7 to receive the portion 3 of the axle. The grease-cage 5 is formed with a plurality of radial longitudinal slots 8, which extend through from the periphery thereof to the longitudinal passage 7, as shown clearly in Fig. 3. At the inner or large end of the longitudinal passage 7 the grease-cage is formed with a plurality of grooves 9, which extend through to the slots 8. The grease-cage 5 is held upon the axle by means of a nut 10 or other suitable device.

Surrounding the grease-cage 5 is a cylindrical sleeve 11, which is mounted tightly within the hub 12 of the wheel. The cylindrical sleeve 11 is formed with a longitudinal spline-groove 13, which is adapted to receive the rib 6 upon the grease-cage 5, so as to cause said cage to revolve with the wheel. The wheel is held in place upon the axle by means of a washer 14 and nut 15 or other devices suitable for the purpose.

Constructed as above described the improved device is used in the following manner: The hub 12, together with the sleeve 11, is removed from the axle by unscrewing the nut 15 and taking off the washer 14. The nut 10 causes the grease-cage 5 to remain upon the axle when the wheel is removed. Grease or other suitable lubricating material is smeared or inserted into the grooves 8 of the lubricating-cage and the wheel is replaced thereon. As the wheel rotates the grease is fed freely to the portion 3 of the axle. Furthermore, the grease oozes through the grooves 9 so as to lubricate the collar 2 and prevent wear between the same and the adjacent portions of the hub and grease-cage.

It will be apparent from the foregoing description that the nut 10 constitutes retaining means for holding the grease-cage on the axle, and that the nut 15 and the washer 14 constitute separate retaining means for holding the wheel upon the axle, whereby the wheel can be removed without the necessity of removing the grease-cage. Furthermore, it will be apparent that the rib 6 and the spline-groove 13 constitute means for causing the grease-cage to rotate with the wheel.

It will be observed from Fig. 2 that the slots 8 gradually increase in width from the outer to the inner end of the cage. For this reason a larger quantity of lubricant is fed to the tapered portion 3 at the large end thereof than at the small end thereof, and the tendency of the lubricant to work out toward the small end of the axle is thus compensated for by feeding the greatest quantity of oil to the large end of the tapered portion.

The improved cage of this invention is strong, simple, and durable in construction, as well as thoroughly efficient in operation. By reason of the fact that it can be cast from any suitable metal, if desired, it is extremely inexpensive in construction.

Having thus described the invention, what is claimed as new is—

A journal-bearing comprising an axle having a tapered end, a grease-cage mounted thereon and having a longitudinal rib, a longitudinal tapered passage to receive the axle, a plurality of radial longitudinal slots extending through to the passage, and a plurality of grooves formed at the inner end of the longitudinal passage and communicating with the inner ends of the slots, a nut for holding the grease-cage on the axle, a hub having a sleeve surrounding the grease-cage, said sleeve being formed with a spline-groove to receive the rib on the grease-cage, and a second nut for holding the hub in position.

In testimony whereof I affix my signature in presence of two witnesses.

MICHAEL H. WHALEN.

Witnesses:
W. H. CLARKE,
ROSA WHALEN.